Dec. 7, 1971   P. LEVINGER   3,625,001
LINK FOR USE IN MAKING A LINKAGE FOR A WATCH BRACELET OR
SIMILAR ARTICLE AND EXPANSIBLE LINKAGE MADE THEREFROM
Filed May 13, 1970   2 Sheets-Sheet 1

INVENTOR
PAUL LEVINGER
BY
Alike, Thompson & Bronstein,
ATTORNEYS

Dec. 7, 1971   P. LEVINGER   3,625,001
LINK FOR USE IN MAKING A LINKAGE FOR A WATCH BRACELET OR
SIMILAR ARTICLE AND EXPANSIBLE LINKAGE MADE THEREFROM
Filed May 13, 1970   2 Sheets-Sheet 2

INVENTOR
PAUL LEVINGER
BY
*Like, Thompson & Bronstein*
ATTORNEYS

United States Patent Office 3,625,001
Patented Dec. 7, 1971

3,625,001
LINK FOR USE IN MAKING A LINKAGE FOR A WATCH BRACELET OR SIMILAR ARTICLE AND EXPANSIBLE LINKAGE MADE THEREFROM
Paul Levinger, Providence, R.I., assignor to Textron Inc., Providence, R.I.
Filed May 13, 1970, Ser. No. 36,922
Int. Cl. F16g 13/24
U.S. Cl. 59—79 R                                   12 Claims

ABSTRACT OF THE DISCLOSURE

A link for use in making a linkage for a watch bracelet or similar article and an expansible linkage made from a series of such links. Each link includes an inner link having top, side and bottom walls. An ornamental insert is positioned above the top wall of each inner link and at least its upper portion is wider than the top wall of the inner link. The insert is secured to the inner link by a retaining member which has inwardly extending end flanges which engages the upper surfaces of outwardly extending end members of the insert. When a plurality of such links are assembled side by side in a linkage and the linkage is viewed from the top, the sides of the upper portions of the inserts abut each other and the inserts present the appearance of a ribbon extending longitudinally of the linkage between the inwardly extending flanges of the retaining members.

BACKGROUND OF THE INVENTION

For many years links have been provided for use in making linkages for watch bracelets, identification bracelets and similar articles which include ornamental inserts each of which is held in place by a retaining member, which forms a rectangular frame member, the upper inwardly extending flanges of which are in contact with the outer portions of the upper surfaces of the insert so that the central upper surface of the insert is exposed to view in the rectangular opening formed between the inwardly extending flanges of the retaining member. Such retaining members have downwardly extending side walls with inwardly turned flanges or tabs to secure the retaining member to a hollow link housing the mechanism which provides expansibility to a linkage made of a series of such links.

When a bracelet composed of a plurality of such links is viewed from the top, one sees a series of inserts enclosed in rectangular frames.

Examples of linkages embodying such links are found in the following U.S. patents: Reilly—2,283,015, May 12, 1942; Vastano—2,805,541, Sept. 10, 1957; and Augenstein—2,889,681, June 9, 1959.

However, such prior art links cannot be used to provide a bracelet which, when viewed from the top, presents an appearance of a ribbon of abutting inserts extending longitudinally of the bracelet.

By securing a thin strip of artificial leather to the top and side surfaces of each link with adhesive, bracelets have been made which present such an appearance. However, when it is desired to use a thicker insert made of acrylic plastic, glass, ceramic or similar materials it cannot be attached to the link securely enough by adhesive to provide a durable linkage.

Accordingly, there has been a recognized long-felt need for a link construction which is durable, inexpensive to manufacture and which when assembled side-by-side in a linkage and the linkage is viewed from the top, the sides of the upper portions of the inserts abut each other and the inserts present the appearance of a ribbon extending longitudinally of the linkage.

There has also been a recognized need for such a link construction which can be used in expansible linkages of the types shown in U.S. Pats. 2,689,450 to Stiegele and 3,307,348 to Vanover.

BRIEF SUMMARY OF THE INVENTION

One object of this invention is to provide a link of the aforesaid type which is economical to manufacture.

Another object is to provide a new link which when assembled with a plurality of similar links may be used to provide the above-mentioned aesthetic design or appearance.

A further object is to provide such a link which is durable and entirely satisfactory in use.

Another object is to provide an expansible linkage of the types shown in said Stiegele and Vanover patents embodying such links.

Further objects and advantages of the invention will be apparent to persons skilled in the art from the following description taken in conjunction with the accompanying drawings.

In general, each link embodying this invention includes an inner link having top, side and bottom walls and an ornamental insert positioned above the top wall of the inner link with at least the upper portion of the insert being wider than the top wall of the inner link. The insert has outwardly extending end members the upper surfaces of which are positioned below the upper surface of the central portion of the insert. The insert also has a pair of cutouts or notches, one located at each side of the insert below its upper surface and the upper surface of each notch extends outwardly to the adjacent side wall of the insert generally parallel to the top wall of the inner link. The insert is secured to the inner link by a retaining member which has side walls at least the upper portions of which are received in the side notches of the insert. The insert also has inwardly extending end flanges which engage the upper surfaces of the outwardly extending end members of the insert.

In the preferred embodiment, the retaining member is secured to the inner link by tabs which project inwardly from the lower edges of the side walls of the retaining member.

In addition, the upper surface of the insert may be longitudinally convex and the upper surfaces of the inwardly extending flanges of the retaining member may form continuations of this longitudinally convex surface of the insert. The insert may be made of an acrylic plastic having a glossy appearance which is black or some other color or it may be made of other plastics, glass, ceramics or any other suitable material. The retaining member may be made of ornamental metal such as gold filled, silver or stainless steel stock.

The retaining member also preferably has end walls at least the lower portions of which are spaced outwardly from the ends of the bottom wall and at least the lower portions of the ends of the side walls of the inner link.

The preferred expansible linkage comprises two rows of links, each link extending in a direction generally transverse to the length of the linkage. A first connecting member is provided which has a leg located within a first link of one row of links and extending in a direction generally transverse to the length of the linkage and means spaced from said leg is provided for rotatably connecting the first connecting member to a first link in the other row of links. A second connecting member is provided which has a leg located in the first link of said one row of links and extending in a direction generally transverse to the length of the linkage and means spaced from said leg is provided for rotatably connecting the second connecting member to a second link in said other row which is located adjacent to said first link in said other row of links. Resilient means is associated with said first link of said one row of links and said legs of the first and second connecting members which are located therein to permit expansion and contraction of the linkage. Each link of the upper row of links include one of the novel inserts and retaining members of this invention.

When the resultant linkage is viewed from the top, the sides of the upper portions of the inserts abut each other and the inserts present the appearance of a ribbon extending longitudinally of the linkage between the inwardly extending flanges of the retaining members.

It will be apparent to persons skilled in the art that this invention has solved the recognized long-felt need for a link of this type which is economical, durable and entirely satisfactory in use and which when assembled with other similar links provides an expansible linkage of the types shown in said Stiegele and Vanover patents.

DETAILED DESCRIPTION OF THE PREFERRED EMBODIMENT

Figure 1:
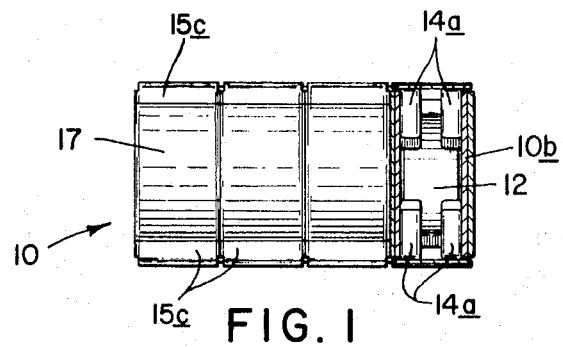
FIG. 1 is a top plan view of a segment of an expansible linkage embodying this invention with the parts shown in fully contracted positions and partly in section, the section being taken on the line 1—1 of FIG. 2.

While the novel link may be used in making bracelet linkages of many known types, it will be shown in an expansible linkage of the type shown in said Stiegele and Vanover patents since that linkage is claimed in combination with a plurality of the novel links.

The linkage comprises a row of top links 10 and a row of bottom links 11 connected together by U-shaped connecting members 14 having legs 14a, 14b, connected together by end members 14c.

Figure 2:
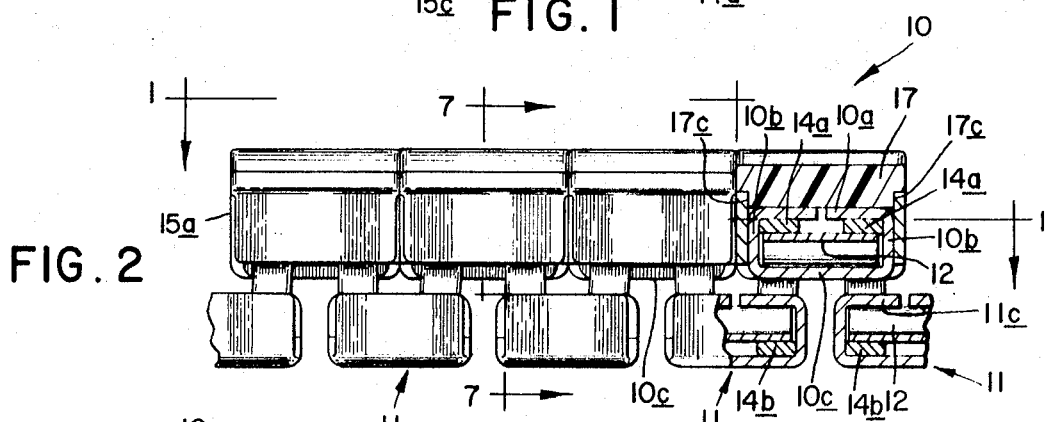
FIG. 2 is a side view of the linkage of FIG. 1 and partly in section, the section being taken on the line 2—2 of FIG. 7.
Figure 4:
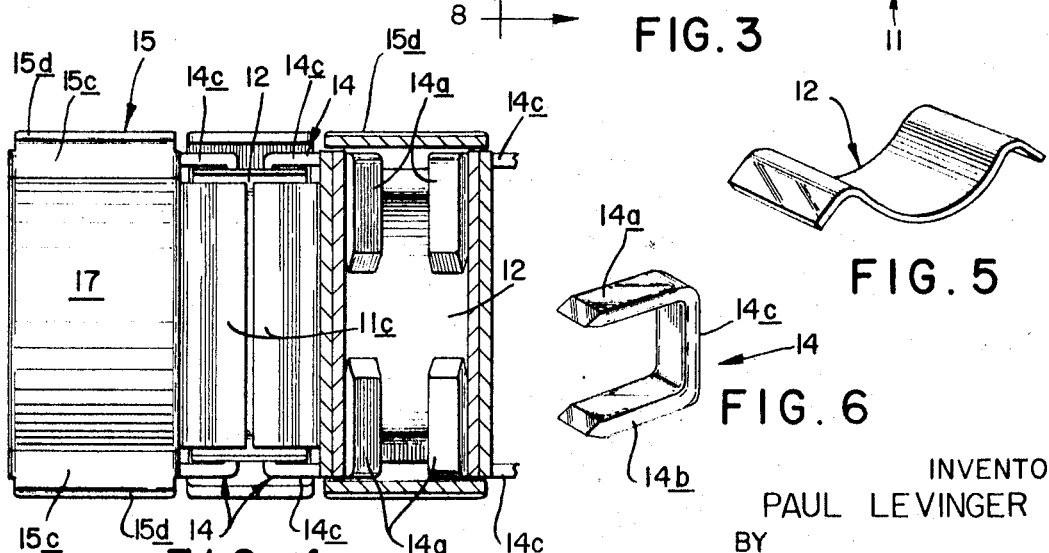
FIG. 4 is a plan view of a segment of the linkage with the parts shown in expanded positions and partly in section, the section being taken on the line 4—4 of FIG. 3.
Figure 5:
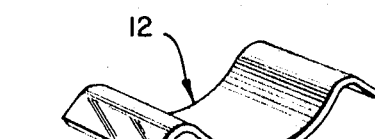
FIG. 5 is an enlarged view in perspective of a flat spring adapted to be disposed in each link.
Figure 6:
FIG. 6 is an enlarged view in perspective of one of the U-shaped connecting members.

In contracted position, the links of the top row of links are staggered with relation to the links 11 of the bottom row as shown in FIG. 2. As shown in FIGS. 1 and 4, each link extends in a direction generally transverse to the length of the linkage.

As best shown in FIGS. 11, 2, 12 and 13, each top link 10 includes an inner link which consists of a top wall 10a, side walls 10b and bottom wall 10c. Notches 10d are provided on the bottom wall 10c. Each top link also includes a retaining member 15, the side walls 15a of which are provided with the tabs 15b, which are bent into the notches 10d to secure the retaining member to the inner link.

Figure 7:
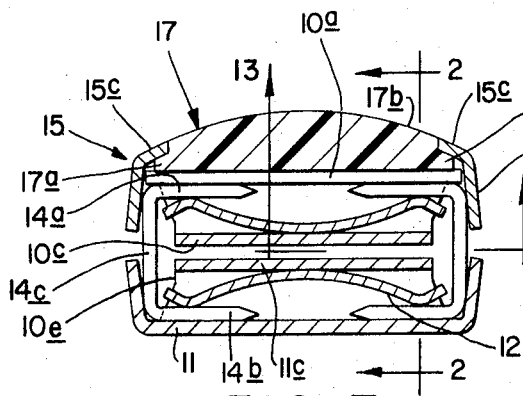
FIG. 7 is an enlarged section taken on the line 7—7 of FIG. 2.
Figure 8:
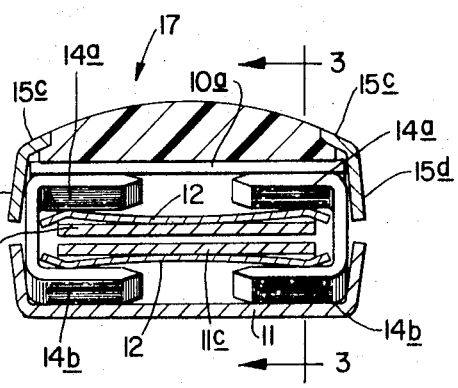
FIG. 8 is an enlarged section taken on the line 8—8 of FIG. 3.
Figure 9:
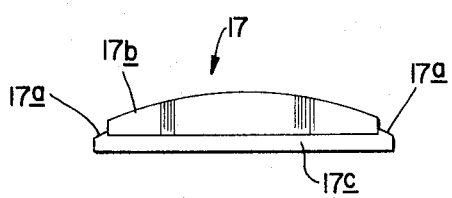
FIG. 9 is an enlarged side view of an ornamental insert embodying this invention.
Figure 10:
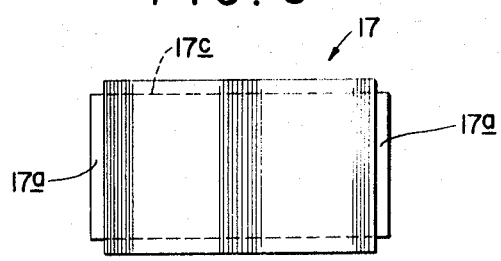
FIG. 10 is an enlarged top plan view of the insert.
Figure 11:
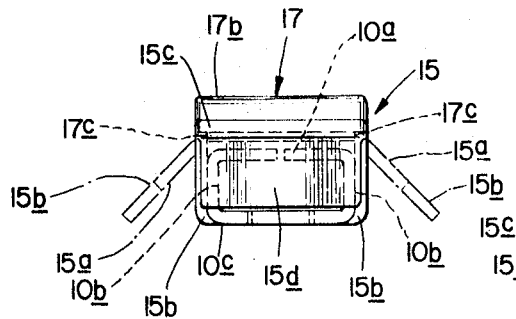
FIG. 11 is an enlarged end view of an assembled inner link, insert and retaining member with the side walls of the retaining member shown in dot dash in their positions prior to being moved inwardly into engagement with the side walls of the inner link.
Figure 12:
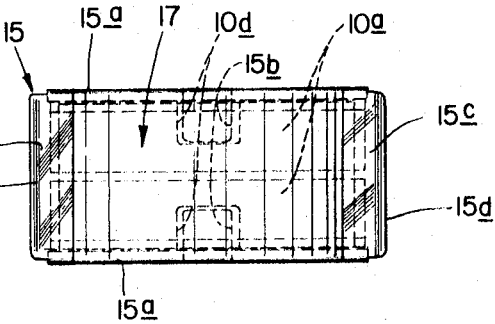
FIG. 12 is an enlarged top plan view of a link embodying this invention.
Figure 13:
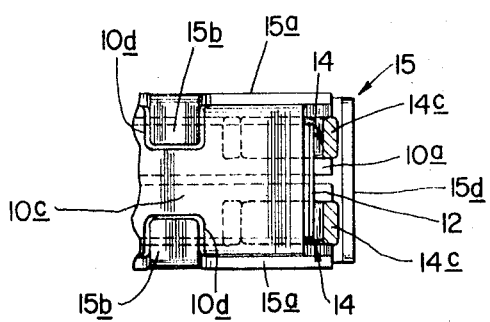
FIG. 13 is a section taken on the line 13—13 of FIG. 7.

Flat springs 12 are located in the links of both rows of links. As best shown in FIGS. 7 and 8, they are seated upon the inner walls 10c and 11c of the links and act against the legs 14a and 14b of the connecting members.

Figure 3:
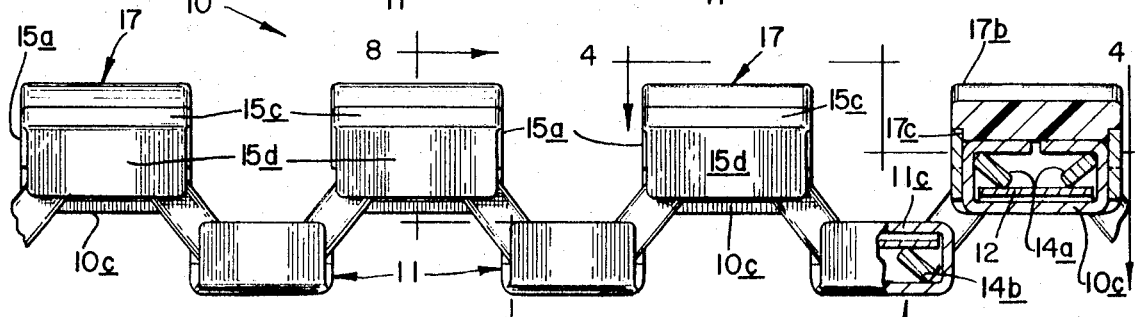
FIG. 3 is a view like FIG. 2, but with the parts shown in expanded positions, the section being taken on the line 3—3 of FIG. 8.

As shown in FIGS. 3, 7 and 8, each pair of U-shaped connecting members 14 at one side of the linkage have their legs 14a located within an inner link of the first row of links. The second leg 14b of one of this pair of U-shaped members is located within a first link 11 of the second row of links and the second leg 14b of the second U-shaped member is located within a second link 11 of the second row of links which is adjacent to said first link of the second row.

Each pair of U-shaped members 14 at the opposite side of the linkage have first legs 14a located within said first link of the first row of links, the second leg 14b of one of these U-shaped members is located within a first link 11 of the second row of links and the second leg 14b of the other of this pair of U-shaped members is located within said second link of the second row of links which is adjacent to said first link of the second row.

When the linkage is in a contracted position and viewed from the side as in FIG. 2, the longitudinal axis of the leg 14a of a first connecting member of each pair is located at one side of the longitudinal centerline of the first link of the first row of links 10, the longitudinal axis of the other leg 14b of this connecting member is located at the adjacent side of the longitudinal axis of said first link in the second row of links 11, the longitudinal axis of the leg 14a of the second connecting member of this pair of connecting members is located at the opposite side of the longitudinal centerline of the first link in the first row of links and the longitudinal axis of the other leg 14b of the second connecting member of this pair is located at the side of the longitudinal centerline of said second link in the second row of links 11 which is towards the first link in the second row.

In the resultant linkage, the end members 14c of the connecting members are substantially parallel to each other and their longitudinal centerlines are generally normal to the outer surfaces of the inner links and the bottom links when the linkage is contracted and viewed from the side as in FIG. 2.

Each connecting member leg is of greater width than thickness.

As best shown in FIGS. 7, 9, 10, 11 and 12, the ornamental insert 17 which may be made of an acrylic plastic having a glossy appearance which is black or any other desired color, of other plastics, glass, ceramics or any other suitable material is positioned above the top wall 10a of the inner link and the upper portion of the insert is wider than the top wall 10a of the inner link. The insert has outwardly extending end members 17a, the upper surfaces of which are positioned below the upper convex surface 17b of the central portion of the insert. The insert also has a pair of cutouts or notches 17c, one located at each side of the insert below its upper surface and the upper surface of each notch extends outwardly to the adjacent side wall of the insert generally parallel to the top wall of the inner link. The insert is secured to the inner link by a retaining member 15 which has side walls 15a at least the upper portions of which are received in the side notches of the insert. The retaining member also has inwardly extending end flanges 15c which engage the upper surfaces of the outwardly extending end members 17a of the insert.

As stated above, the retaining member is secured to the inner link by the tabs 15b which project inwardly from the lower edges of the side walls of the retaining member into the notches 10d in the bottom wall of the inner link.

The upper surface of the insert is longitudinally convex and the upper surfaces of the inwardly extending flanges 15c of the retaining member form continuations of this longitudinally convex surface of the insert. The retaining member may be made of ornamental metal such as gold filled, silver or stainless steel stock.

The retaining member also has end walls 15d, the lower portions of which are spaced outwardly from the ends of the bottom wall 10c and from at least the lower portions 10e of the ends of the side walls of the inner link.

This spacing provides openings between the end walls 15d of the retaining member and the outer ends of the inner link for receiving end portions 14c of the connecting members when the linkage is extended from contracted to expanded positions.

As will be noted from FIG. 1, when a plurality of links 10 are assembled side-by-side in a linkage and the linkage is viewed from the top, the sides of the upper portions of the inserts 17 abut each other and the inserts present an attractive appearance of a ribbon extending longitudinally of the linkage between the inwardly extending flanges 15c of the retaining members.

This invention provides a link which is economical to manufacture, is durable and entirely satisfactory in use and can be used to provide an expansible linkage of the types shown in said Stiegele and Vanover patents as well as other types.

While one desirable embodiment of the invention has been shown in the drawings, it is to be understood that this disclosure is for the purpose of illustration only and various changes in shape, proportion and arrangement of parts as well as the substitution of equivalent elements from those shown and described herein may be made without departing from the spirit and scope of the invention as set forth in the appended claims.

I claim:

1. A link for use in making a linkage for a watch bracelet or similar article comprising in combination
   an inner link having top, side and bottom walls,
   an ornamental insert positioned above the top wall of said inner link and at least the upper portion of which is wider than said top wall, said insert having outwardly extending end members the upper surfaces of which are positioned below the upper surface of the central portion of said insert and a pair of notches, one located at each side of the insert below its upper surface, the upper surface of each notch extending outwardly to the adjacent side wall of said insert, and
   a retaining member secured to said inner link and having side walls at least the upper portions of which are received in said notches and inwardly extending end flanges which engage the upper surfaces of said outwardly extending end members of said insert,
   whereby when a plurality of said links are assembled side-by-side in a linkage and the linkage is viewed from the top, the sides of the upper portions of said inserts abut each other and said inserts present the appearance of a ribbon extending longitudinally of the linkage between said inwardly extending flanges.

2. A link according to cliam 1 wherein the retaining member is secured to the inner link by tabs which project inwardly from the lower edges of the side walls of the retaining member.

3. A link according to claim 1 wherein the retaining member also comprises end walls at least the lower portions of which are spaced outwardly from the ends of the bottom wall and at least the lower portions of the ends of the side walls of the inner link.

4. A link according to claim 1 wherein the upper surface of said insert is longitudinally convex.

5. A link according to claim 4 wherein the upper surfaces of said inwardly extending flanges of the retaining member form continuations of said longitudinally convex surface of the insert.

6. A link according to claim 1 wherein said insert is made of plastic and said retaining member is made of ornamental metal.

7. An expansible linkage including in combination,
   two rows of links, each link extending in a direction generally transverse to the length of the linkage,
   a first connecting member having a leg located within a first link of one row of links and extending in a direction generally transverse to the length of the linkage and means spaced from said leg for rotatably connecting the first connecting member to a first link in the other row of links,
   a second connecting member having a leg located in said first link of said one row of links and extending in a direction generally transverse to the length of the linkage and means spaced from said leg for rotatably connecting the second connecting member to a second link in said other row which is located adjacent to said first link in said other row of links, and
   resilient means associated with said first link of said one row and said legs of the first and second connecting members which are located therein,
   wherein the improvement comprises
   each link of the upper row of links comprising an inner link having top, side and bottom walls,
   an ornamental insert positioned above the top wall of said inner link and at least the upper portion of which is wider than said top wall, said insert having outwardly extending end members the upper surfaces of which are positioned below the upper surface of the central portion of said insert and a pair of notches, one located at each side of the insert below the upper surface of said insert, the upper surface of each notch extending outwardly to the adjacent side wall of said insert, and
   a retaining member secured to said inner link and having side walls at least the upper portions of which are received in said notches and inwardly extending end flanges which engage the upper surfaces of said outwardly extending end members of said insert,
   whereby when a plurality of said links are assembled side-by-side in a linkage and the linkage is viewed from the top, the sides of the upper portions of said inserts abut each other and said inserts present the appearance of a ribbon extending longitudinally of the linkage between said inwardly extending flanges.

8. A linkage according to claim 7 wherein the retaining member is secured to the inner link by tabs which project inwardly from the lower edges of the side walls of the retaining member.

9. A linkage according to claim 7 wherein the retaining member also comprises end walls at least the lower portions of which are spaced outwardly from the ends of the bottom wall and at least the lower portions of the ends of the side walls of the inner link forming openings for receiving end portions of said connecting members when the linkage is extended from contracted to expanded positions.

10. A linkage according to claim 7 wherein the upper surface of said insert is longitudinally convex.

11. A linkage according to claim 10 wherein the upper surfaces of said inwardly extending flanges of the retaining member form continuations of said longitudinally convex surface of the insert.

12. A linkage according to claim 7 wherein said insert is made of plastic and said retaining member is made of ornamental metal.

References Cited
UNITED STATES PATENTS

| | | | |
|---|---|---|---|
| 2,283,015 | 5/1942 | Reilly | 63—5 R |
| 2,689,450 | 9/1954 | Stiegele | 59—79 R |
| 2,805,541 | 9/1957 | Vastano | 59—79 R |
| 2,889,681 | 6/1959 | Augenstein | 59—79 B |
| 2,986,871 | 6/1961 | Augenstein | 59—79 B |
| 3,307,348 | 3/1967 | Vanover | 59—79 R |

CHARLES W. LANHAM, Primary Examiner

G. P. CROSBY, Assistant Examiner

U.S. Cl. X.R.

63—5 R